United States Patent [19]

MacArthur

[11] Patent Number: 5,251,058
[45] Date of Patent: * Oct. 5, 1993

[54] MULTIPLE BEAM EXPOSURE CONTROL

[75] Inventor: Thomas D. MacArthur, Pasadena, Calif.

[73] Assignee: Xerox Corporation, Stamford, Conn.

[*] Notice: The portion of the term of this patent subsequent to Oct. 2, 2007 has been disclaimed.

[21] Appl. No.: 421,227

[22] Filed: Oct. 13, 1989

[51] Int. Cl.$^5$ .................. G02F 1/01; G02F 1/11; G02F 1/29; G02B 5/30
[52] U.S. Cl. .................. 359/249; 359/250; 359/256; 359/259; 359/276; 359/286; 359/305; 358/296; 346/108
[58] Field of Search ............ 350/371, 373, 380, 383, 350/384, 390, 401, 358, 374, 388; 369/44.37, 44.38; 359/245, 246, 249, 250, 256, 259, 276, 285, 286, 305, 310, 315, 316, 494, 495, 497, 499; 346/108; 358/474, 480, 296

[56] References Cited

U.S. PATENT DOCUMENTS

| | | | |
|---|---|---|---|
| 3,383,460 | 5/1968 | Pritchard | 359/250 |
| 3,495,892 | 2/1970 | Dailey | 359/259 |
| 3,503,670 | 3/1970 | Kosanke et al. | 350/382 |
| 3,591,254 | 7/1971 | Browne | 350/371 |
| 3,684,350 | 8/1972 | Wentz | 350/403 |
| 3,764,218 | 10/1973 | Schedewie | 350/382 |
| 4,474,435 | 10/1984 | Carlsen et al. | 350/381 |
| 4,686,542 | 8/1987 | Yip et al. | 346/108 |
| 4,733,252 | 3/1988 | Daniele et al. | 358/296 |

FOREIGN PATENT DOCUMENTS

| | | | |
|---|---|---|---|
| 0108453 | 9/1978 | Japan | 350/403 |
| 0108457 | 9/1978 | Japan | 359/259 |
| 0169821 | 7/1986 | Japan | 359/286 |
| 0972461 | 11/1982 | U.S.S.R. | 350/371 |
| 1409711 | 10/1975 | United Kingdom | 359/247 |

OTHER PUBLICATIONS

Ammann; "Modification of Devices Normally Operating Between Input and Output Polarizers to Allow Their Use With Arbitrarily Polarized Light" Journal of the Optical Society of America; vol. 55, No. 4, 1965 pp. 412–417.

Primary Examiner—Bruce Y. Arnold
Assistant Examiner—R. D. Shafer
Attorney, Agent, or Firm—Robert E. Cunha

[57] ABSTRACT

In a raster output scanner, a system for using one original beam and one facet of a rotating polygon to generate a scan line which can be turned on to have three levels of intensity. The original beam is first separated into two beams in a beam splitter. The resultant beams are polarized ninety degrees apart, and directed to the modulator. The beams are a sufficient distance apart so that the A/O modulator can modulate each beam with a minimum of crosstalk. The output beams are then brought together and combined into one beam without optical interference because the beams are polarized ninety degrees apart. The beam can have several levels of intensity and be used to create several levels of gray scale at the output.

3 Claims, 5 Drawing Sheets

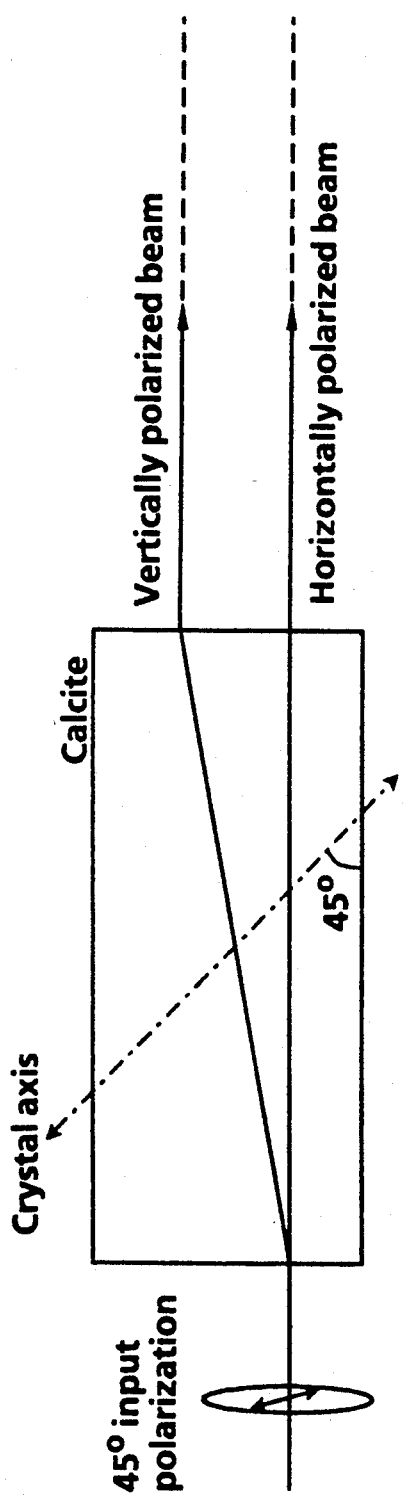
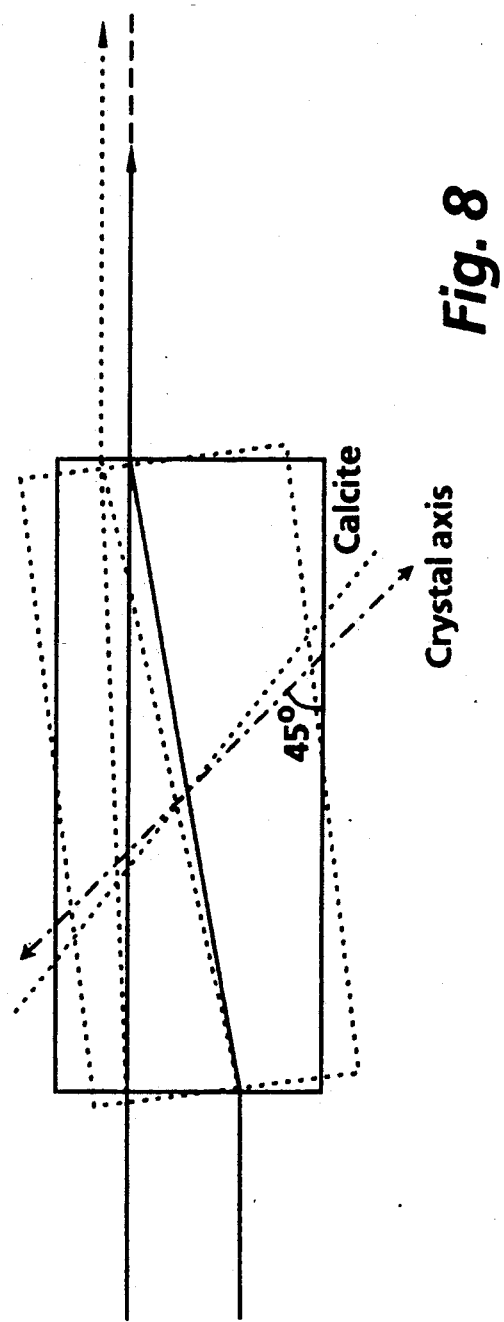
Fig. 7
Fig. 8

MULTIPLE BEAM EXPOSURE CONTROL

MULTIPLE BEAM EXPOSURE CONTROL

This invention relates to intensity modulation of a laser beam used in an electronic printer to expose a photoconductive surface. The invention discloses the separation of one laser beam into two which are separately modulated and polarized. These two beams are then brought back together and are used to expose a light sensitive surface such as a xerographic plate. The beams are brought back together so that they are at exactly the same position, the result being a multi-level intensity beam which can be used to generate highlight color or a grey scale charge pattern on the photoreceptor.

BACKGROUND OF THE INVENTION

Some electronic laser printers use scanning laser light sources to discharge a photoconductor in the laser printer. The laser beam strikes the photoconductor and, in the well known manner, discharges the drum, leaving a charge pattern on the surface of the photoconductor in the shape of the information to be printed. Then the drum is developed with toner which is transferred to an output document. A typical laser printer is of the on/off type with no capability for gray scale output. In other words, the photoconductor either is insulating or, upon exposure to light, conducting. However, newer photoconductors have the capability of discharging only a part of the stored charge. This presents the opportunity for gray scale output because with varying levels of charge, varying levels of toner can be made to adhere to the area, which would produce a gray scale image upon transfer of the image to paper or other medium.

Thus, it is sometimes desirable to selectively discharge an electronic printer photoconductor to one of several different charge levels. To do this with a laser printhead, the exposure must be varied by changing either the intensity or the exposure time of the scanning beam. That is, the brightness of the scan beam must be capable of change, in order to discharge more or less of the photoconductor, or the scanning rate of the beam must be controllable so that the beam can be made to stay at various output locations varying amounts of time depending on the desired discharge rate for the photoreceptor. Since photoconductor velocity through the scanning region of the printer or copier is usually fixed because of synchronous speed requirements, the laser beam intensity usually must be varied. However, problems in the prior art were encountered in modulating the intensity at the video data rate and in maintaining the required intensity uniformity at each level across the format. Combining two or more beams to form one intensity variable beam also is difficult since two closely spaced beams will interfere with each other to form artifacts or patterns on the output copy.

SUMMARY OF THE INVENTION

The present invention described below provides a method of beam intensity modulation using high performance printheads with minimum design modifications. This invention creates an intensity modulated beam by separating the original beam into two beams which are independently modulated. Then, after modulation, the beams are brought together to form one beam which can be turned on to have any one of three levels of intensity at the photoreceptor plane. There will be no optical interference since the separating step polarizes the beams ninety degrees apart from one another. The result is a multi-level highlight color or grey scale charge pattern on a photoconductor.

The most basic form of this invention is the combination of a beam splitter to break the single input beam into two beams which are separated by a predetermined distance and by a polarization of ninety degrees, an acousto-optic (A/O) modulator which modulates the two beams without a significant amount of crosstalk, and a beam recombiner which brings the beams back together. Facet tracking is also accomplished in the modulator, i.e., the beam tracks the current facet as it swings through its arc. Finally, there is no interference between the two beams when they are ultimately brought together since they are polarized ninety degrees apart at that point.

One problem that remains is that in this configuration one beam travels a longer distance and therefore both beams will not focus at the same point. In this situation a birefringent waist location compensator can be used to bring the waists back together again. An alternative is to use a half wave plate between the modulator and the beam recombiner. In this case one beam is diverted in the beam splitter and the other is diverted in the recombiner. Therefore both beams will focus at the same plane.

All of the above embodiments require a polarization insensitive modulator. If a polarization sensitive modulator is used, the system will require a half wave plate for one beam between the splitter and the modulator, and another for the other beam between the modulator and the recombiner. In this configuration, the beams will have the same polarization at the modulator.

BRIEF DESCRIPTION OF THE DRAWINGS

For a more complete understanding of the invention, reference may be had to the following detailed description of the invention in conjunction with the drawings wherein:

FIG. 7 is a schematic diagram of a beam splitter.

FIG. 8 is a schematic diagram of a beam recombiner.

Detailed Description of the Invention

Figure 1:
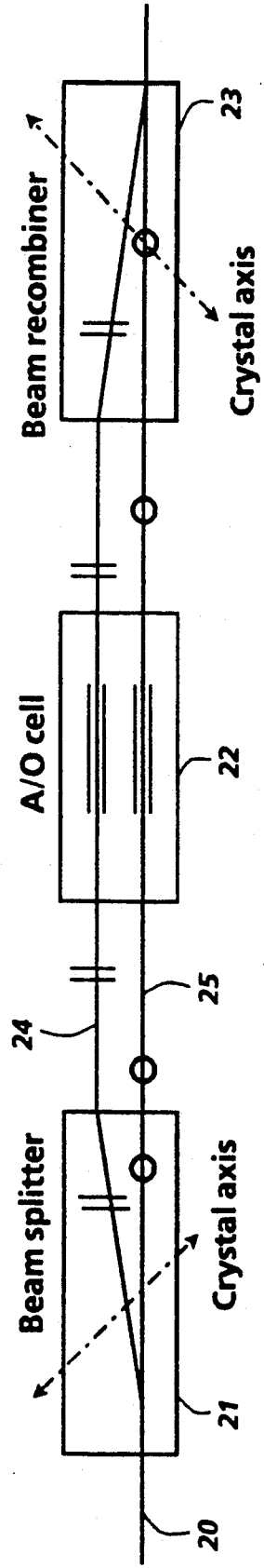
FIG. 1 shows an overall schematic diagram of one embodiment of the modulator.

FIG. 1 is the most basic embodiment of the invention. A single beam 20 enters the polarizing beam splitter 21 which is made from a material with large birefringence such as calcite or rutile. This beam splitter 21 is used to split the one input beam from a polarized laser 20, polarized at 45 degrees with respect to the plane formed by the incident beam and the crystal axis, into two orthogonally polarized beams with a final exit separation distance equal to the distance between the two electrodes of the A/O or Bragg cell modulator 22.

The A/O modulator 22 has two functions, to provide equal facet tracking for both beams and to modulate the beams independently. The beam is turned on and off in accordance with the data stream input to its driver, and will reach the printer photoconductive surface, while tracking the current polygon facet. Finally the beams are brought together by a beam recombiner 23 to form one scan line with several levels of intensity.

Figure 2:
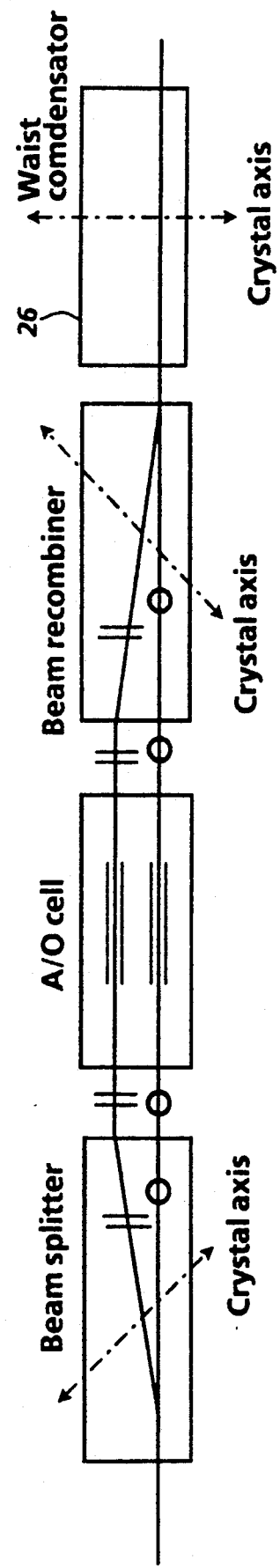
FIG. 2 shows an embodiment having a waist compensator.

One problem with this configuration is that the upper beam 24 travels a longer (or shorter, depending on the crystal and its orientation) path than the lower beam 25. Therefore, the waist of the upper beam will occur to the left (right) of that of the lower beam 25. The waist is the narrowest portion of the beam. This waist shift can be corrected by using a waist compensator 26, as shown in FIG. 2. The waist compensator 26 has different light speed transmission as a function of polarization, and therefore will shift the waist of one beam with respect to the other. Therefore, both beams will focus to the narrowest spot possible at the same plane.

Figure 3:
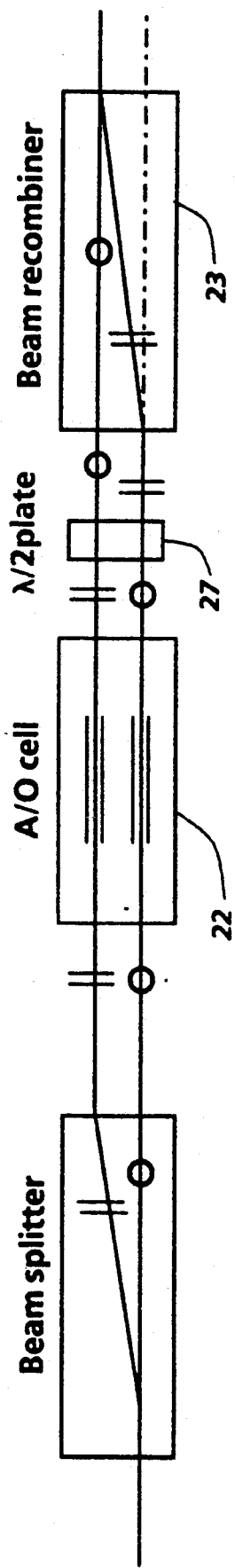
FIG. 3 shows an embodiment with equal beam path lengths.

An embodiment that will not have to compensate for the waist shift is shown in FIG. 3. Here a half wave plate 27 is used between the A/O modulator 22 and the beam recombiner 23. The result is that both beam paths are of equal length.

Figure 4:
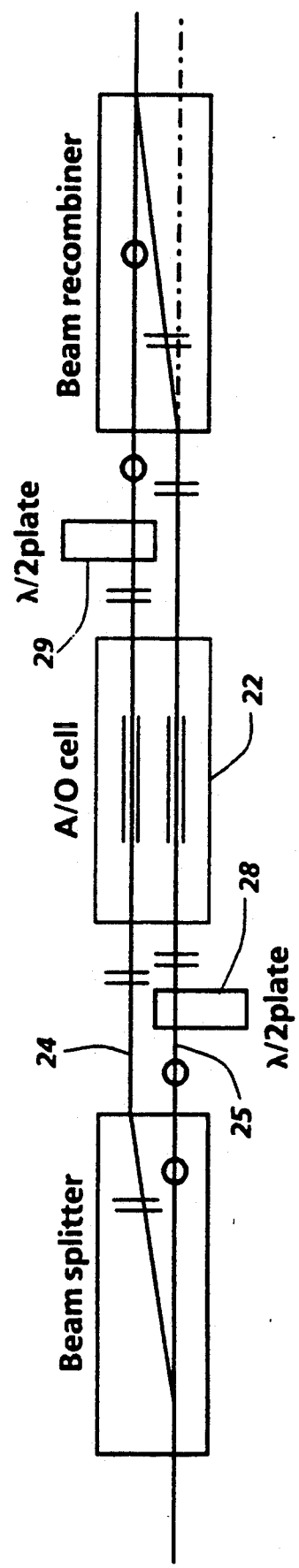
FIG. 4 shows an embodiment which uses two half wave plates.

A problem with all of the above embodiments is that a polarization insensitive A/O cell is preferred, thereby allowing the same amount of power to be used to modulate beams of any polarization, and such a cell material is not always available for the optical wavelengths and/or carrier frequencies required by the system. The embodiment shown in FIG. 4 equalizes the polarization of both beams prior to entering the A/O cell 22. Therefore, a polarization sensitive medium can be used. The polarization can be equalized by inserting a half wave plate 28 in the path of the lower beam 25 prior to the A/O cell 22 and a second half wave plate 29 in the path of the upper beam 24 after the A/O cell 22. Thus, the beams have the same polarization while passing through the A/O cell. The half wave plate 28 29 material can be, for example, crystal quartz designed for light of 6328 Angstroms.

Figure 9:
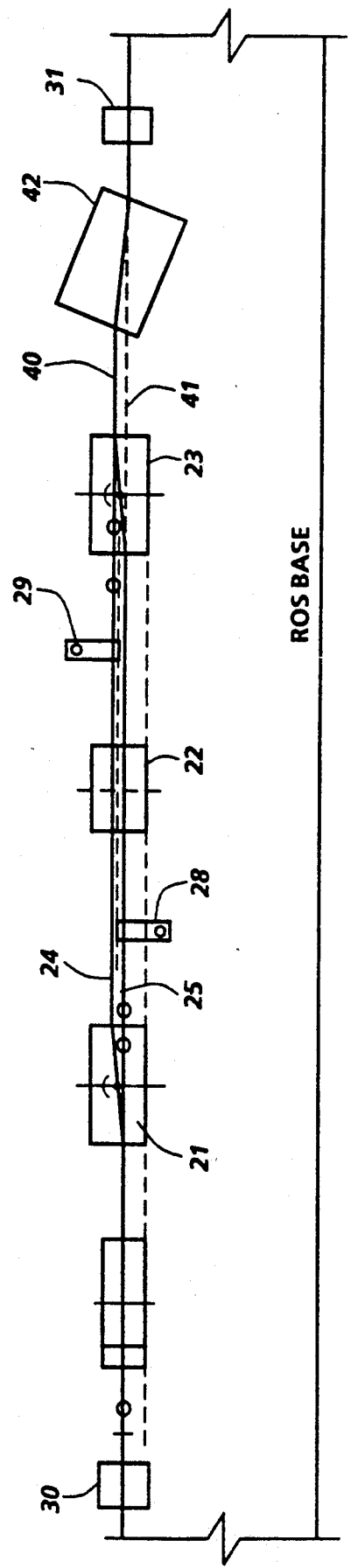
FIG. 9 is a side view of the modulator.

As shown in FIG. 9, as the beam 40 exits the recombiner 23, it is parallel to, but displaced above, the system center line 41, but it is convenient in an optical system that the output beam is on line with the input. Therefore a sagital plate 42 is provided. This element is a rectangular piece of optical glass, fine annealed, grade A, and is adjusted to the angle required to bring the beam 40 down to the centerline 41.

Figure 10:
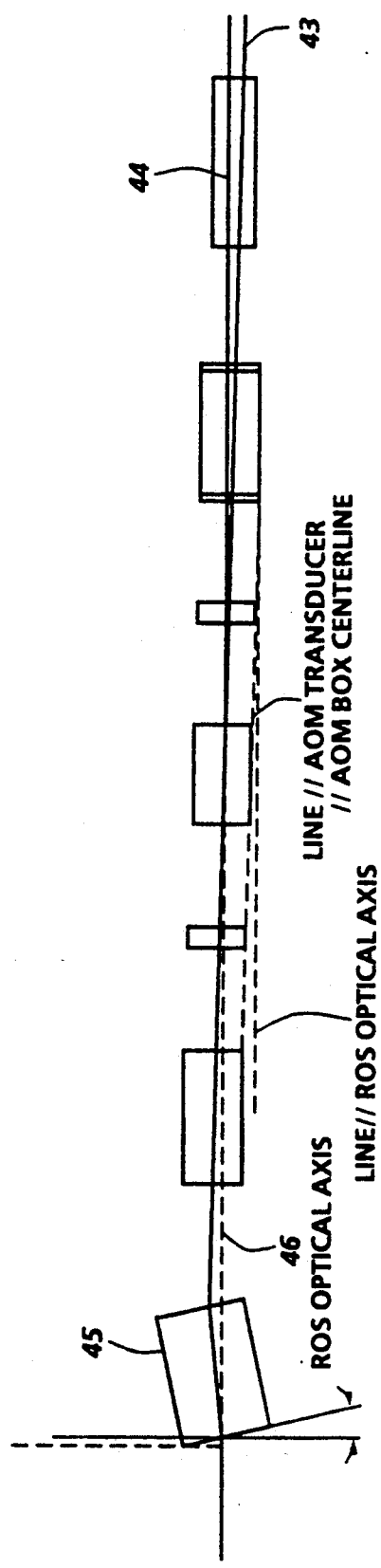
FIG. 10 is a top view of the modulator.

In this system the beam is OFF when the modulator does not diffract the beam, and the beam in ON when the diffracted first order beam is directed exactly along the centerline 46. These relationships are shown in FIG. 10 which is a top view of the elements of FIG. 9 and which shows the collinearity wedge 45. This is an almost-rectangular piece of fine annealed, grade A, optical glass, in that one surface deviates from its rectangular form by one or several degrees, and is adjusted so that when the beam 43 is not deflected by the modulator it will be angled downward as shown. When properly adjusted, the first order beam 44 from the modulator will be aligned with the center line 46.

Figure 5:
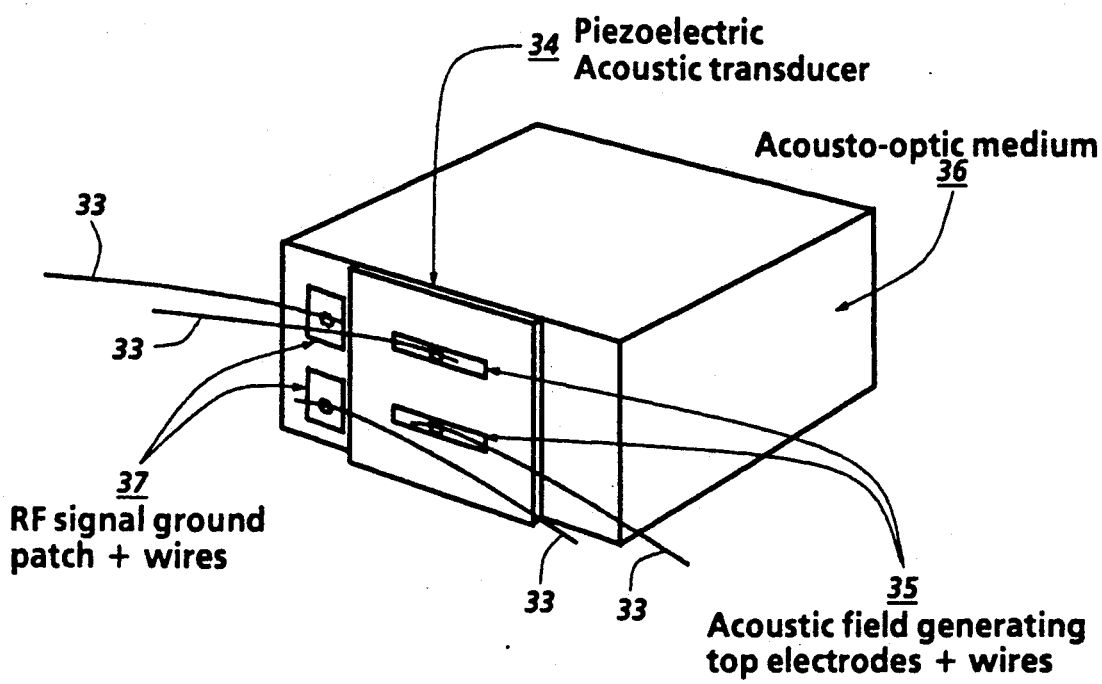
FIG. 5 is a diagram of an acousto-optic cell.
Figure 6:
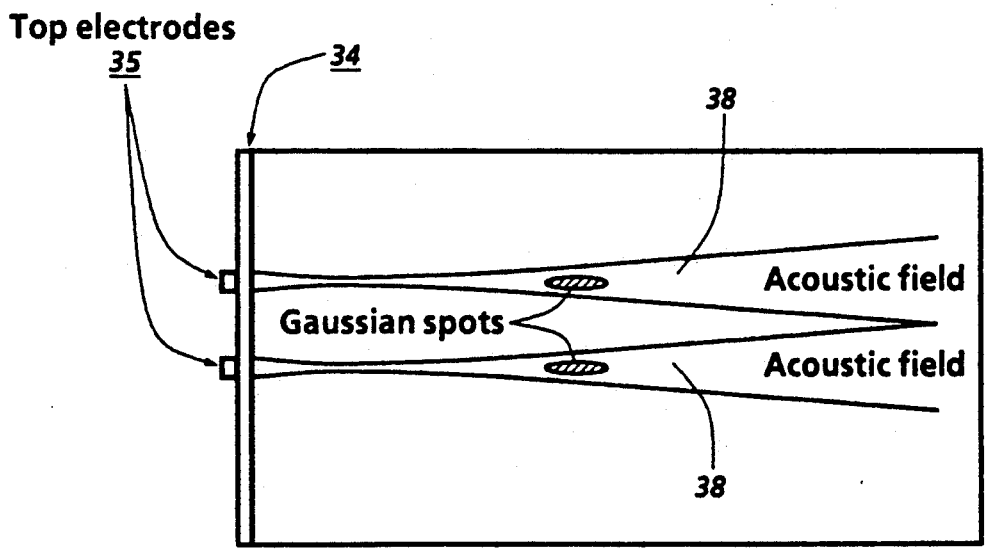
FIG. 6 is a schematic diagram of the A/o cell.

The A/O cell 22 in FIGS. 1–4 is shown in more detail in FIGS. 5 and 6. The bulk of the unit is an acousto-optic medium 36, attached to which is a piezoelectric acoustic transducer 34. The cell has two ground 37 and two rf 35 vacuum metalised gold electrodes. Two rf signals are applied by wires 33 between electrodes and ground, to form two acoustic fields 38 which modulate the beams and also provide facet tracking. There is a lens, not shown, ahead of the cell to focus the beams into the shape of the Gausian spots shown in FIG. 6 so that the entire beam is within the acoustic field. The wires are ultrasonically welded to the gold electrodes and are reinforced with beads of epoxy. The distance between electrodes must be at least several times the electrode width to provide non-interfering acoustic fields for each of the optical beams for independent modulation. The acousto-optic medium can be one of the varieties of optical grade glass or single crystals of $TeO_2$, $LiNbO_3$, $PbMoO_4$, $GaP$, etc. The first order beam is the one used as the output to the remainder of the output scanner, so that if there is a field applied to the modulator, the beam is ON. When there is no acoustic field, the beam is OFF. In addition, the frequency of the applied rf is changed to change the deflection angle. This accomplishes facet tracking.

The beam splitter 21 of FIG. 1 is a polarizing beam splitter with preferably large birefringence such as calcite, rutile, etc. This unit is used to split one incident beam coming in at forty-five degrees with respect to the crystal axis into two orthogonally polarized beams with a final exit separation distance equal to the distance between the two electrodes on the Bragg cell, as illustrated in FIG. 7.

Placing the polarization angle of the input beam at 45 degrees with respect to the beam splitter will provide the effect of having equal energy in the horizontally and vertically polarized components of the beam. The energy in the two output beams will thus be equal, which is the desired condition. Circularly polarized light would have the same effect.

The same result could be obtained if an unpolarized source were to be used. Unfortunately, so called "unpolarized lasers" are not truly unpolarized, but generate orthogonally polarized beams that have somewhat random or "uncontrolled" polarization properties. The problem of using such a laser is that the intensities of the orthogonally polarized components do not maintain a constant ratio, but vary in what is commonly called "polarization noise". This type of laser could still be used by alignment of the two polarization components at 45 degrees with respect to the beam splitter. Each of the two output beams will thus contain equal components of the polarization noise, which tend to cancel. However, a potential problem still exists in that without special precautions in the design of the laser, the angle of the two orthogonal components may change with time, and upset the noise cancellation effect. Since polarization noise and polarization angle exhibit good stability in polarized lasers, such lasers are presently preferred.

In order to achieve the proper alignment of the laser polarization angle, a means to rotate the laser in its mount can be provided. However, unless the laser rotation axis is concentric with the beam axis, rotating the laser will introduce beam misalignment. A more satisfactory method of aligning the polarization angle is by introducing a half wave or full wave linear retarder 30 into the laser beam preceding the beam splitter 21. Rotation of the half wave retarder will cause rotation of the polarization angle at twice the rate, i.e. a two degree rotation of the retarder will produce a four degree rotation of the polarization angle. A full wave retarder will produce rotation at the same rate. Since the intent is to provide an adjustment to closely balance the intensity of the two beams at the photoreceptor, other combinations of retarders, such as the liquid crystal polarization rotator, can be used to produce rotation of an elliptically polarized beam, thus providing a finer adjustment.

Another consideration is that the polygon has reflectance properties that vary in a different manner for the horizontally and vertically polarized light, as the angle of incidence changes with polygon rotation. Thus, the ratio of intensities of the two beams will vary along the scan line. If this variation can not be tolerated, then a quarter wave retarder 31 can be placed into the two beams, following the beam combiner 23, with its axis at a 45 degree angle relative to the axis of the beam recombiner. This serves to convert the two linear but orthogonally polarized beams into clockwise and counterclockwise circularly polarized beams. Polygon rotation will affect both beams similarly, and the intensity ratio will remain constant throughout the scan. A halfwave retarder could also provide a similar result by aligning its axis at 22.5 degrees relative to the beam combiner axis. This arrangement will introduce a 45 degree rotation of the polarization angle of both beams, and again both beams will be affected in a similar manner by the polygon.

The beam recombiner 23 of FIG. 1 is used immediately after the two beams have been modulated-deflected. It has the same construction as the beam splitter 21 but is positioned in reverse, so that the beams will come together and will be combined into one intensity modulated beam. This is illustrated in FIG. 8. If the recombiner is composed of calcite, the distance between scan lines can be adjusted as shown, by adjusting the angle of the recombiner with respect to the beam.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:
1. A modulator for modulating a beam comprising:
a splitter for splitting one original beam into first and second parallel beams, said first and second parallel beams being polarized ninety degrees apart,
two intensity modulators for individually and independently intensity modulating each parallel beam,
a recombiner for bringing the parallel beams, which have travelled different distances, together so that their beam axes are collinear, and
a waist compensator, positioned after said recombiner, for reducing the transmission rate of the beam which has travelled the shorter distance, relative to the other beam, to bring the waists of both beams to the same point.
2. A modulator for modulating a beam comprising:
a splitter for splitting one original beam into first and second parallel beams, said first and second parallel beams being polarized ninety degrees apart,
two intensity modulators for individually and independently intensity modulating each parallel beam,
a recombiner for bringing the parallel beams together to form one intensity modulated beam, and
means for adjusting the polarization angle of the original beam prior to said original beam's intersecting said splitter to equalize the amount of power in each of the two beams output by said splitter.
3. A modulator for modulating a beam comprising:
a splitter for splitting one original beam into first and second parallel beams, said first and second parallel beams being polarized ninety degrees apart,
two intensity modulators for individually and independently intensity modulating each parallel beam,
a recombiner for bringing the parallel beams together to form one intensity modulated beam, and
a half wave retarder for rotating the polarization of the modulated beam 45 degrees after its exit from said recombiner.

* * * * *